Patented Mar. 27, 1934

1,952,696

UNITED STATES PATENT OFFICE 1,952,696

MANUFACTURE OF THERMO-PLASTIC MATERIALS OR ARTICLES COMPRISING A CELLULOSE DERIVATIVE

Samuel Whyte, Redhill, and William Edward Lord, Hayes, England, assignors to Electric and Musical Industries Limited, Hayes, England, a company of Great Britain No Drawing. Application July 1, 1932, Serial No. 620,540. In Great Britain July 15, 1931

4 Claims. (Cl. 106—40)

The present invention relates to the manufacture of thermoplastic materials, which have a basis of a cellulose derivative, for example, cellulose acetate, and to articles, such, for example, as talking machine records made therefrom.

The invention particularly relates to the manufacture of a material wherein there is incorporated with the cellulose derivative a plastifier and a resin, with or without filling materials, dyes, pigments or the like, without the use of volatile solvents for dissolving the cellulose derivative.

In previously known processes for the manufacture of thermo-plastic material from a cellulose derivative and plastifier without the use of volatile solvents for the cellulose derivative, it has been customary to mix the cellulose acetate or other cellulose derivative, the plastifier and the filling material in a mixing or kneading machine, and during the whole or part of the mixing operation to apply heat. After the mixing operation is complete, the composition is removed from the mixing machine and either rolled out into sheets on rolls or moulded into blocks.

For the purpose of producing material for talking machine records, the very intimate mixture of the ingredients is of the highest importance. The principal difficulty is experienced in obtaining complete and uniform distribution of the cellulose derivative, and we have found that a far more intimate mixture between the cellulose derivative, the plastifier and filler than is possible with the hot mixing only preparatory to rolling is obtained if the cellulose derivative is first mixed with a resin, e. g. acaroid resin, in the fluid state and the mixture, after setting, is ground, the plastifier and filling material being then added and the whole of these ingredients ground together without heat; and further we have found that by the use, for example, of a "Kek" grinding mill or other high-speed grinding mill, a sufficiently intimate mixing is obtainable to make a subsequent kneading with heat unnecessary before the material goes to the rolling mill. This method of obtaining the cellulose derivative in a state of very fine division is of particular advantage where a cellulose derivative of high viscosity is used, since a substance having this property is especially difficult to grind alone.

According to one feature of the present invention, a process for the production of a thermoplastic material from a cellulose derivative, plastifier and resin with or without filling material pigments or the like, comprises first combining the cellulose derivative and resin in the absence of the plastifier to form a homogeneous mass, reducing this mass to an extremely fine powder and then mixing the plastifier with this powder without the use of a volatile solvent for the cellulose derivative until a homogeneous mixture is obtained.

The powder thus obtained may be worked up in known manner on heated mixing rolls or in a kneading machine in order to obtain plastification of the cellulose derivative and the resultant product rolled out into sheets or formed into articles of the desired shape.

Preferably, however, in accordance with a further feature of the invention, the cellulose derivative and resin obtained as above in the form of a fine powder are intimately mixed with the plastifier in a grinding mill or like apparatus and the mixture then moulded under heat and pressure, without preliminary mixing on heated rolls or in a kneading machine.

By this process it is possible to obtain the cellulose derivative in an extremely fine state of sub-division. For example, the homogeneous mass formed of cellulose derivative and resin can easily be reduced to a powder which will pass a 200 mesh sieve, while if the cellulose derivative alone were ground, such a state of sub-division, if obtainable, could only be obtained with the greatest difficulty. In the ordinary way, the cellulose derivative would only pass a 40 mesh sieve. The fine state to which the cellulose derivative is reduced in the process of the present invention enables plastification thereof to proceed uniformly and rapidly in the subsequent operations of the process.

In carrying out one process for preparing thermoplastic material in accordance with the invention, we may proceed as follows:

Cellulose acetate and resin are worked up together on hot rolls until a homogeneous mass is obtained. This mass is then cooled and ground to pass a 200 mesh sieve. The powder obtained is mixed with the plastifier and finely ground filling materials, and the mixture is put through an ordinary blade mixer and then passed into apparatus wherein the mixture is subjected to a grinding or beating action. A "Kek" mill may be employed for this part of the process.

The plastifier used may be either solid or liquid. It is preferable, as stated above, to mix it with the other ingredients in a blade mixer in order to distribute the plastifier before the mixture goes to the "Kek" mill, otherwise the plastifier would tend to pass through the high-speed "Kek" mill without mixing properly with the other substances.

The extremely intimate mixture formed by the grinding or beating action of the "Kek" mill is then worked up on heated mixing rolls at a temperature of from 260 to 320° F., plastification of the cellulose acetate taking place. The powdery mixture adheres readily to the rolls and after being rolled and worked for about 10 to 15 minutes is removed and passed between heated calendar rolls for the purpose of producing a sheet or blanket which may then be cut up into any desired size or shape.

A suitable composition for preparing a record material by the process of the invention is as follows, the portions being by weight:

|  | Per cent |
|---|---|
| Red acaroid resin | 15 |
| Cellulose acetate | 15 |
| Plastifier | 12 |
| Amyl stearate | ½ |
| Filler | 56 |
| Carbon black | 1 |
| Dye | ½ |

In another method of carrying out the process according to the invention, we may proceed as follows, the substances employed being the same as those used in the above process:

Coarsely ground cellulose acetate is mixed with acaroid resin on heated rolls for about five minutes. The mixture is then removed from the rolls and, after being allowed to cool, is ground to a fine powder.

The remainder of the components are now added to the fine powder and thoroughly mixed in a ball mill or like apparatus for approximately four hours in order to ensure intimate blending. After having been ball milled, the powder has a homogeneous appearance and may be moulded at the usual temperature and pressure without preliminary mixing on heated rolls or in a kneading machine.

For example, in making talking machine records, the powder obtained as above may be placed directly on to the matrices, preheated for ten seconds, and pressure then applied.

Any suitable natural or synthetic resin may be incorporated with the cellulose derivative for the purpose specified. As alternative natural resins, rosin or copal may, for example, be used. In the case of synthetic resins, the process would, preferably, be confined to those materials which are permanently thermoplastic and heat stable. Synthetic resins having these properties comprise, amongst others, glycol phthalate derivatives, vinyl polymers and their derivatives, and sulphonamide resins, derived from aromatic hydrocarbons and containing a methylene group.

Instead of the working up of the cellulose derivative and resin on hot rolls, any other suitable method may be employed for effecting an intimate mixing of these two substances. For example, the resin may be dissolved in a volatile solvent which does not dissolve the cellulose derivative, and the latter then added to the resin solution. The cellulose derivative will be impregnated by the resin and upon applying gentle heat to the mixture, the solvent will be rapidly expelled and a friable mass will remain. Suitable solvents for the majority of resins, which are also non-solvents for the cellulose derivative, are benzene and alcohol.

With synthetic resins susceptible to heat-hardening, the use of a resin solvent is of particular advantage in that lower working temperatures may be employed. The mass is worked into a plastic state at a temperature below that at which hardening occurs, thereby avoiding any pre-curing of the resin which would be likely to occur if the mass were worked hot in the absence of solvent.

The minimum amount of resin which must be incorporated with cellulose derivative depends to a large extent upon the original fineness of the cellulose derivative and also upon the particular resin employed. In the case of acaroid resin, which has been found to be particularly suitable for the purpose hereinbefore described, the minimum resin content was found to be 28 per cent by weight of cellulose acetate used when the latter was in the form of a powder which would pass only a 20 mesh sieve.

What we claim is:

1. A process for the production of a thermoplastic material from a cellulose derivative, plastifier and a resin with or without filling material, pigments or the like which comprises combining the cellulose derivative and resin in the absence of the plastifier to form a homogeneous mass, reducing said mass to an extremely fine powder, and mixing the plastifier with said powder, in the absence of a volatile solvent for the cellulose derivative, until a homogeneous mixture is obtained.

2. A process as claimed in claim 1, wherein said homogeneous mass is reduced to a powder which will pass a 200 mesh sieve.

3. A process as claimed in claim 1, wherein the plastifier and said powder are intimately mixed in a grinding mill or similar apparatus, the mixture then worked up on heated rolls or in a kneading machine to obtain plastification of the cellulose derivative, and the resultant product rolled out into sheets or formed into articles of the desired shape.

4. A process as claimed in claim 1, wherein the plastifier and said powder are intimately mixed in a grinding mill or similar apparatus and the mixture then moulded under heat and pressure.

SAMUEL WHYTE.
WILLIAM EDWARD LORD.